United States Patent
Govindarajan et al.

(10) Patent No.: US 12,436,647 B2
(45) Date of Patent: Oct. 7, 2025

(54) SYSTEMS AND METHODS TO CONTROL CROSS-TALK OF AN OPTICAL FIBER-BASED SENSING MODULE

(71) Applicant: Apple Inc., Cupertino, CA (US)

(72) Inventors: Harish Govindarajan, San Jose, CA (US); Yazan Z. Alnahhas, Stanford, CA (US); Prabhakar Gulgunje, Cupertino, CA (US); Shubhaditya Majumdar, Santa Clara, CA (US); Wei Lin, Santa Clara, CA (US); Jianmin Gong, San Jose, CA (US); Anael A. Guilmo, Sunnyvale, CA (US); Yohai Zmora, San Francisco, CA (US); Meng Zhang, San Diego, CA (US); Jeffrey B. Fixler, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/747,231

(22) Filed: Jun. 18, 2024

(65) Prior Publication Data
US 2025/0004598 A1     Jan. 2, 2025

Related U.S. Application Data

(60) Provisional application No. 63/511,545, filed on Jun. 30, 2023.

(51) Int. Cl.
| G06F 3/042 | (2006.01) |
| G02B 6/036 | (2006.01) |
| G02B 6/42  | (2006.01) |

(52) U.S. Cl.
CPC .......... *G06F 3/0421* (2013.01); *G02B 6/036* (2013.01); *G02B 6/4202* (2013.01)

(58) Field of Classification Search
CPC ..... G06F 3/0421; G02B 6/036; G02B 6/4202; G02B 6/02052; G02B 6/03694
See application file for complete search history.

(56) References Cited

U.S. PATENT DOCUMENTS

| 2010/0110027 A1* | 5/2010 | Lipman | G06F 3/0488 |
| | | | 345/173 |
| 2015/0030297 A1* | 1/2015 | Benjamin | G02B 6/443 |
| | | | 385/114 |
| 2021/0142026 A1* | 5/2021 | Hao | G02F 1/133331 |
| 2021/0294029 A1* | 9/2021 | Bickham | G02B 6/02009 |
| 2021/0396935 A1 | 12/2021 | Chen et al. | |

* cited by examiner

*Primary Examiner* — Patrick N Edouard
*Assistant Examiner* — Joseph P Fox
(74) *Attorney, Agent, or Firm* — Kubota & Basol LLP

(57) ABSTRACT

A touch screen device includes a transmitter optical fiber, optical transmitter circuitry, a receiver optical fiber, optical receiver circuitry, and cover material. The transmitter optical fiber and/or the receiver optical fiber include a respective core, a respective absorptive clad circumferentially surrounding the respective core, and/or a respective absorptive jacket circumferentially surrounding the respective absorptive clad.

20 Claims, 7 Drawing Sheets

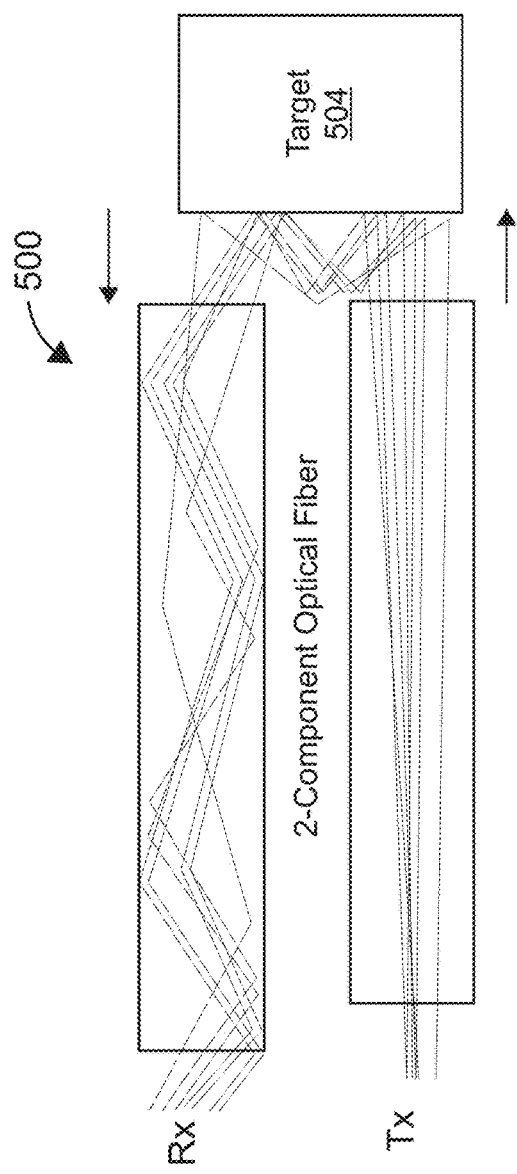
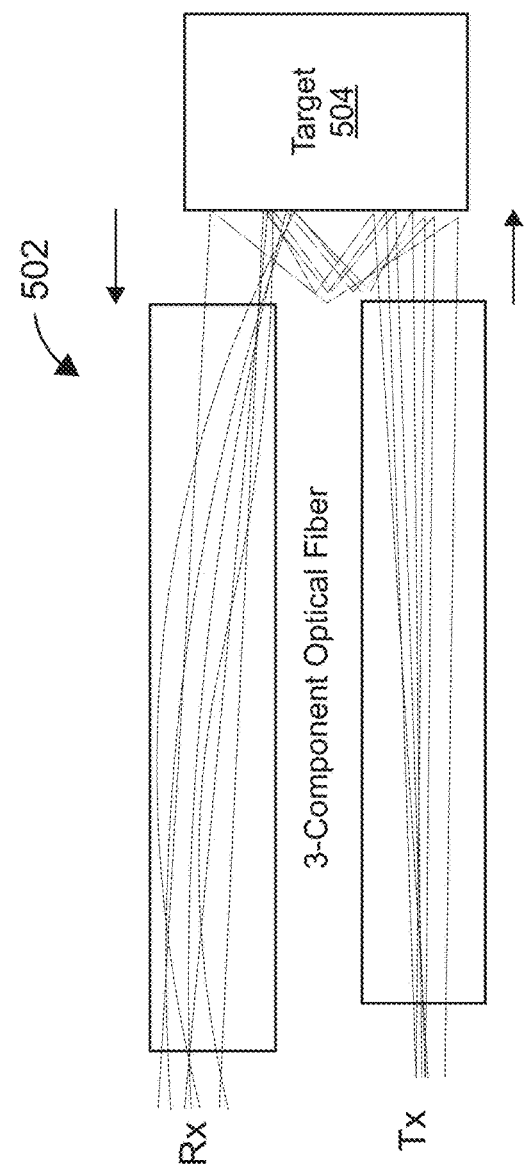
FIG. 5A
FIG. 5B

SYSTEMS AND METHODS TO CONTROL CROSS-TALK OF AN OPTICAL FIBER-BASED SENSING MODULE

CROSS-REFERENCE TO RELATED APPLICATIONS

This application claims the benefit of U.S. Provisional Application No. 63/511,545, filed Jun. 30, 2023, the entire disclosure of which is herein incorporated by reference for all purposes.

FIELD OF THE DISCLOSURE

This relates generally to optical fiber-based sensing systems and methods, and more particularly to systems and methods configured to control cross-talk of an optical fiber-based proximity sensing module.

BACKGROUND OF THE DISCLOSURE

Many types of sensing devices, such as proximity sensors, are presently available in electronic devices to detect a portion (e.g., finger, hand, or ear) of a user when the portion of the user is in proximity to the electronic device. Electronic devices can include a touch screen. For example, a proximity sensor near (e.g., around the perimeter of) a touch screen can detect when a finger of a user is within a threshold distance of the touch screen.

SUMMARY OF THE DISCLOSURE

An electronic device, such as a smartphone, can include one or more proximity sensors to detect an angle of the electronic device relative to a portion of the user and/or the portion of the user being in proximity with (e.g., within the threshold distance of) the electronic device. For example, in response to detecting an ear of the user is in proximity with (e.g., within a threshold distance of) the electronic device and/or the angle of the electronic device (e.g., 10° 30°, 60°, or 90° relative to the portion of the user when the user is making call via the electronic device, processing circuitry of the electronic device deactivates (e.g., turns off) the touch screen of the electronic device. In some examples, processing circuitry of the electronic device reduces a visual prominence of the touch screen or changes the displayed image (e.g., dimmer, more transparent, and/or a different color such as a white screen, a black screen, etc.), reduces a frame rate of the touch screen, and/or reduces a refresh rate of the touch screen while detecting the car of the user is in proximity with the electronic device and/or the angle of the electronic device corresponds to the user making a call via the electronic device. Turning off the touch screen during a phone call while the electronic device is in proximity with the car of the user prevents accidental touch inputs during the phone call and reduces power consumption by the electronic device, thereby improving user-device interactions. In some examples, a proximity sensor can detect when one or more fingers of the user are within a threshold distance of the touch screen and/or detect direct input from a hand of the user (e.g., the one or more fingers in direct interaction with the touch screen). It is to be understood that adjusting a touch screen during a phone call and detecting a touch input are example uses of the proximity sensor, but other applications of the proximity sensor can be used without departing from the scope of the disclosure.

In some examples, a proximity sensor can include a light receiving component (e.g., optical receiver circuitry and/or receiver die) and a light transmitting component (e.g., optical transmitter circuitry and/or transmitter die). The optical transmitter circuitry emits light to a target, and the optical receiver circuitry receives light from the target. For example, the emitted light is interrupted and/or reflected by the target, such as the touch screen of the electronic device. The optical receiver circuitry can detect a change in emitted light after being reflected by the target and can convert the change in emitted light to an electrical output and/or reading. However, cross-talk resulting from unwanted or excessive light scattered between the optical receiver circuitry and the optical transmitter circuitry can cause erroneous outputs and/or incorrect readings by the proximity sensor. For example, cross-talk (e.g., unwanted noise) can cause the proximity sensor to falsely detect a portion (e.g., hand) of the user is in proximity with the electronic device. Accordingly, controlling (e.g., reducing) cross-talk of optical fiber-based proximity sensing modules can prevent erroneous outputs and help improve user-device interactions. Therefore, in some examples, an absorptive material is disposed around optical transceiver circuitry (e.g., optical receiver circuitry and optical transmitter circuitry) to absorb the unwanted or excessive light and reduce cross-talk. While optical fibers including the absorptive jacket are primarily described herein in context of a proximity sensor, it is to be understood that optical fibers including the absorptive jacket are not limited to the proximity sensor. In some examples, the optical fibers including the absorptive jacket can be used in context with other types of optical systems, such as infrared sensors or a camera, and for purposes other than proximity sensing.

BRIEF DESCRIPTION OF THE DRAWINGS

FIGS. 5A-5B illustrates respective side views of a 2-component optical fiber and a 3-component optical fiber according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used, and structural changes can be made without departing from the scope of the disclosed examples.

This relates to a proximity sensing system (e.g., electronic device that includes a touch screen and a proximity sensor) that includes optical transceiver circuitry (e.g., optical transmitter circuitry and optical receiver circuitry) and a cover material. In some examples, the proximity sensing system includes a transmitter optical fiber, optical transmitter circuitry, a receiver optical fiber, and optical receiver circuitry. In some examples, the transmitter optical fiber is disposed between the cover material and a transmitter die including the optical transmitter circuitry. In some examples, the transmitter die includes one or more light emitters and/or is communicatively coupled to the optical transmitter circuitry. In some examples, the receiver die includes one or more photodetectors and/or is communicatively coupled to the optical receiver circuitry. In some examples, the cover material (e.g., glass, crystal, plastic, or any translucent material) is disposed between the target (e.g., top surface of a touch screen of the electronic device) and the transmitter optical fiber and the receiver optical fiber. In some examples, the cover material is a portion of the touch screen of the electronic device (different from the portion of the touch screen optionally corresponding to the target). In some examples, emitted light from the transmitter die and/or optical transmitter circuitry travels through the cover material to the target. In some examples, the light reflected by the target travels through the cover material to the optical receiver circuitry and/or receiver die. In some examples, the transmitter optical fiber (e.g., 2-component fiber) includes a core and an absorptive clad surrounding the core. In some examples, the receiver optical fiber (e.g., 3-component fiber) includes a core, an absorptive clad surrounding the core, and an absorptive jacket surrounding the absorptive clad. In some examples, the absorptive clad and/or absorptive jacket can absorb the unwanted or excessive light scattered between the optical transmitter circuitry and optical receiver circuitry, and thereby reduce cross-talk between optical channels.

Figure 1A:
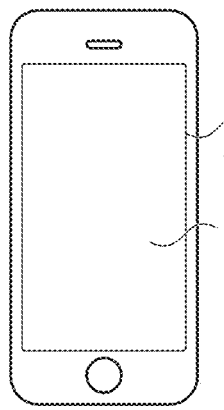
FIGS. 1A-1E illustrate example systems that can include a touch screen according to examples of the disclosure.
Figure 1B:
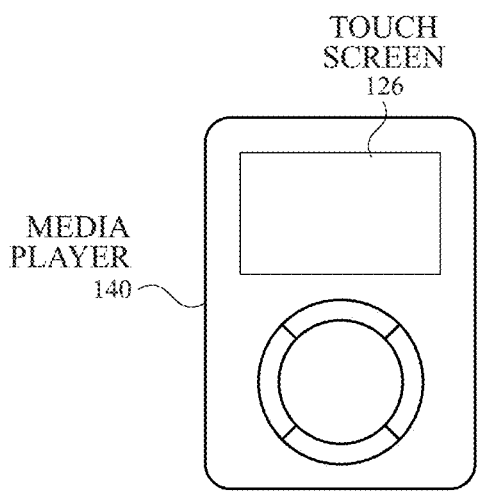
Figure 1C:
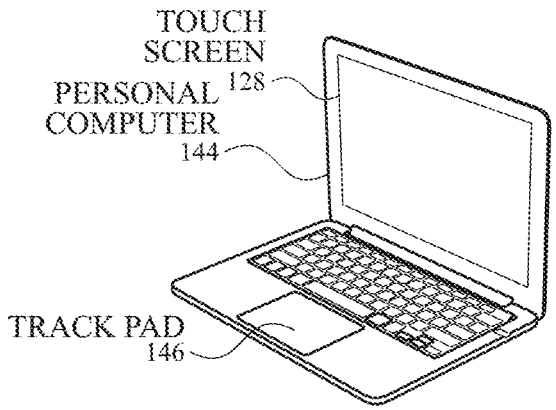
Figure 1D:
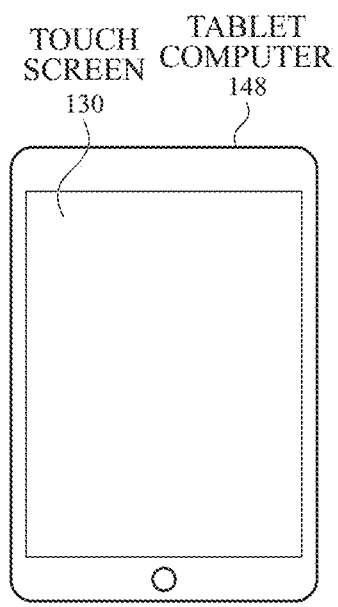
Figure 1E:
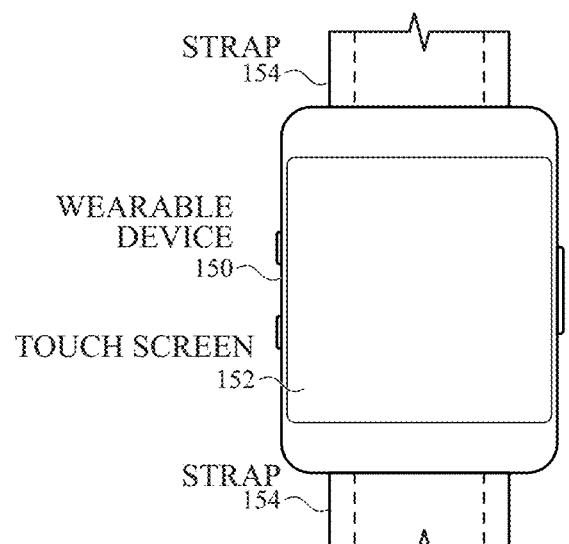

FIGS. 1A-1E illustrate examples of systems, optionally with touch screens (e.g., capacitive touch screens), that can include an example proximity sensing system according to examples of the disclosure. FIG. 1A illustrates an example mobile telephone 136 that optionally includes a touch screen 124 and can include an example proximity sensing system according to examples of the disclosure. FIG. 1B illustrates an example digital media player 140 that optionally includes a touch screen 126 and can include an example proximity sensing system according to examples of the disclosure. FIG. 1C illustrates an example personal computer 144 that optionally includes a touch screen 128 and can include an example proximity sensing system according to examples of the disclosure. FIG. 1D illustrates an example tablet computing device 148 that optionally includes a touch screen 130 and can include an example proximity sensing system according to examples of the disclosure. FIG. 1E illustrates an example wearable device 150 (e.g., a watch) that optionally includes a touch screen 152 and can include an example proximity sensing system according to examples of the disclosure. Wearable device 150 can be coupled to a user via strap 154 or any other suitable fastener. It should be understood that the example devices illustrated in FIGS. 1A-1E are provided by way of example, and other devices can include an example proximity sensing system according to examples of the disclosure. Additionally, although the devices illustrated in FIGS. 1A-1E include touch screens, in some examples, the devices may have a non-touch sensitive display or no display.

Figure 2A:
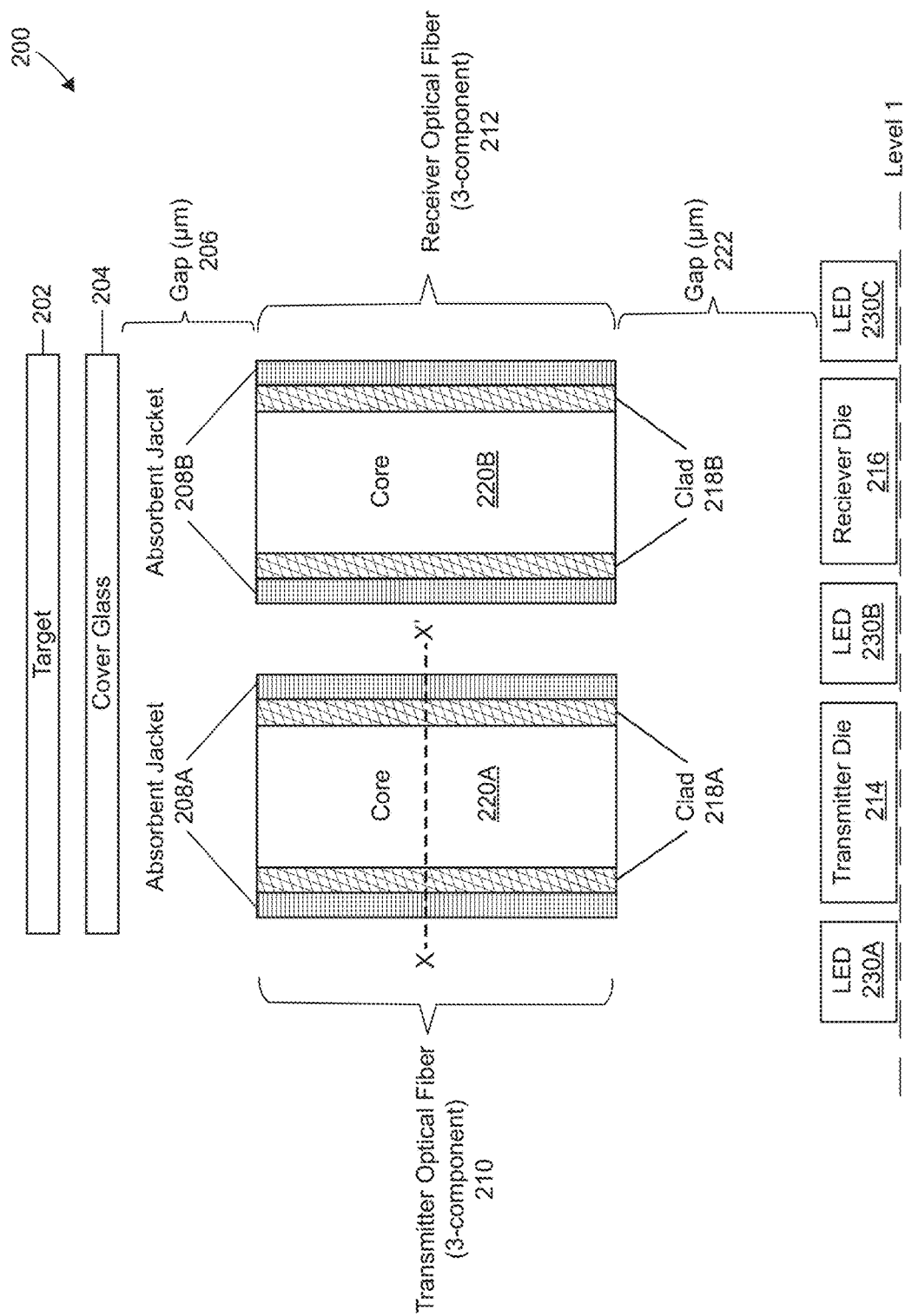
FIG. 2A illustrates a block diagram of an example proximity sensing system including a 3-component optical fiber according to examples of the disclosure.

FIG. 2A illustrates a block diagram of an example proximity sensing system 200 including a 3-component optical fiber according to examples of the disclosure. The proximity sensing system 200 can detect an angle of an electronic device relative to the portion of the user and/or a portion of the user being in proximity with the electronic device. The proximity sensing system 200 can be included in the electronic device, for example, mobile telephone 136, digital media player 140, personal computer 144, tablet computing device 148, wearable device 150, or any mobile or non-mobile computing device. In some examples, the electronic device includes an integrated display (e.g., touch screen) to display images and to detect touch and/or proximity (e.g., hover) events from an object (e.g., active or passive stylus or finger) at or proximate to the surface of the display. In some examples, the proximity sensing system 200 can include a target 202. In some examples, the target 202 includes a top portion of a touch screen of the electronic device.

Figure 4A:
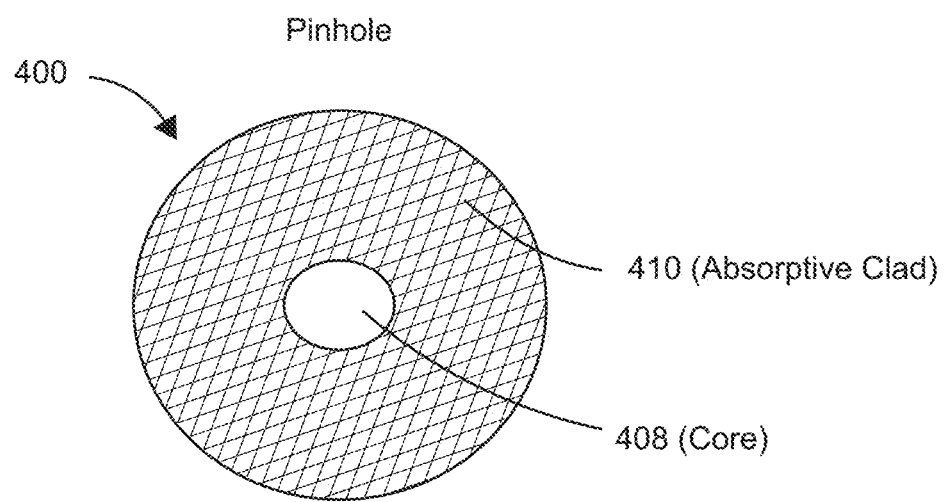
FIGS. 4A-4D illustrate respective cross-sections of respective optical fibers according to examples of the disclosure.
Figure 4B:
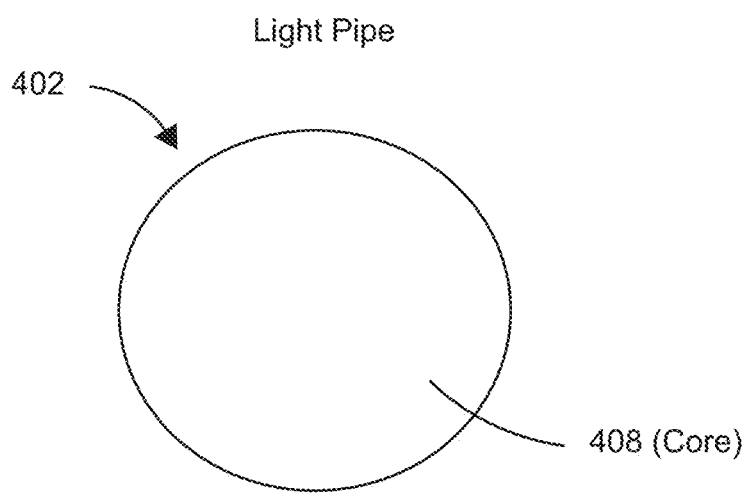
Figure 4C:
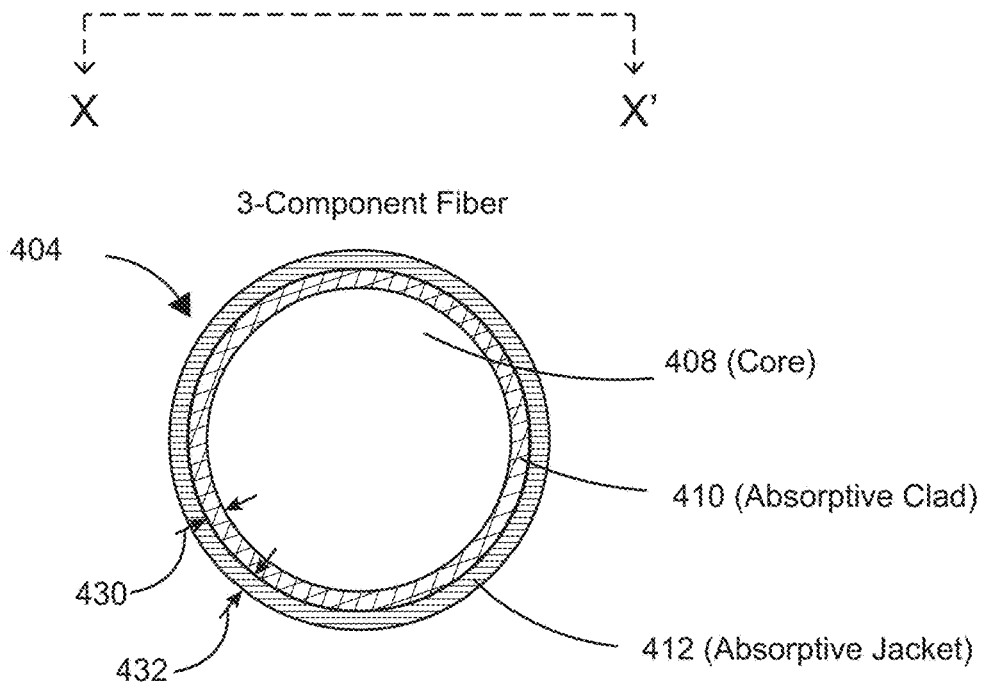

In some examples, the proximity sensing system 200 can include one or more proximity sensors. A proximity sensor can include optical fiber(s) and optical transceiver circuitry (e.g., optical transmitter circuitry and optical receiver circuitry). As illustrated in FIG. 2A, the proximity sensing system 200 includes a transmitter optical fiber 210 and a receiver optical fiber 212. In FIG. 2A, the transmitter optical fiber 210 and the receiver optical fiber 212 are 3-component fibers. That is, each of the transmitter optical fiber 210 and the receiver optical fiber 212 includes a core, an absorptive clad, and an absorptive jacket. For example, the transmitter optical fiber 210 includes core 220A that is coupled to the optical transmitter circuitry. With respect to the transmitter optical fiber 210, the core 220A is circumferentially surrounded by absorptive clad 218A, and the absorptive clad 218A is circumferentially surrounded by absorptive jacket 208A. Similarly, the receiver optical fiber 212 includes core 220B that is coupled to the optical receiver circuitry. With respect to receiver optical fiber 212, the core 220B is circumferentially surrounded by absorptive clad 218B, and the absorptive clad 218B is circumferentially surrounded by absorptive jacket 208B. In some examples, the absorptive clad 218A and/or the absorptive clad 218B is composed of plastic such as fluorinated polymers (e.g., polyvinylidene fluoride (PVDF), tetrafluoroethylene hexafluoropropylene (THV), or thyelene, tetrafluoroethylene, and hexafluoropropylene (EFEP)) or non-fluorinated polymers (e.g., polymethyl methacrylate or polycarbonate). In some examples, absorptive jacket 208A and/or the absorptive jacket 208B is composed of polymethyl methacrylate, polycarbonate, cyclic olefins, optical grade polyester, and/or polystyrene. In some examples, absorptive clad and absorptive jacket include pigmented particles for absorbing specific light wavelengths (e.g., carbon black). As indicated by the dashed line between X and X', structures of the 3-component optical fiber are further described with respect to the cross-section of the 3-component fiber as shown in FIG. 4C.

In some examples, the optical transmitter circuitry emits light (e.g., infrared light or visible light) toward the target 202, and the optical receiver circuitry receives reflected light from the target 202. For example, the emitted light is interrupted and/or reflected by the target 202. The optical receiver circuitry can detect a change in emitted light reflected by the target 202 and can convert the change in emitted light to an electrical output and/or reading. As mentioned above, cross-talk resulting from unwanted or excessive light scattered between the optical receiver circuitry and the optical transmitter circuitry can cause erroneous outputs and/or incorrect readings by the proximity sensor. Accordingly, in some examples, the transmitter optical fiber 210 and the receiver optical fiber 212 of the proximity sensing system 200 include a respective absorptive clad and/or a respective absorptive jacket to absorb the unwanted and/or excessive light between the optical transmitter circuitry and the optical receiver circuitry.

In some examples, the proximity sensing system 200 includes a cover material 204 (e.g., glass, plastic, or any translucent material) disposed between the target 202 and the transmitter optical fiber 210 and the receiver optical fiber 212. In some examples, the cover material is composed of optical grade polymethyl methacrylate, polycarbonate, cyclic olefins, polyester, and/or polystyrene. In some examples, the cover material 204 is translucent such that emitted light from the optical transmitter circuitry (e.g., from the transmitter die 214) travels through the transmitter optical fiber 210 and the cover material 204 to the target 202. In some examples, the light reflected by the target 202 travels through the cover material 204 and the receiver optical fiber 212 to the optical receiver circuitry (e.g., to the receiver die 216). In some examples, the cover material 204 includes a portion of the touch screen of the electronic device (different from the top portion of the touch screen optionally corresponding to the target 202). In some examples, the cover material 204 has a height of less than 20, 50, 100, 150, 200, or 250 micrometers and is composed of any suitable geometric shape. In some example, a gap 206 (e.g., threshold distance) can exist between the cover material 204 and a top portion of the transmitter optical fiber 210 and a top portion of the receiver optical fiber 212. In some examples, adjusting a size of the gap 206 can control cross-talk or the unwanted light scattered between the optical transmitter circuitry and the optical receiver circuitry. For example, reducing the size of the gap 206 can reduce cross-talk and the unwanted light scattered between the transmitter optical fiber 210 and the receiver optical fiber 212. In some examples, the gap 206 is 1, 10, 20, 50, 100, 150, or 200 micrometers. In some examples, the gap 206 is between 10 to 30 micrometers. In some examples, the gap 206 is between 150 to 170 micrometers. In some examples, the size of the gap 206 varies in accordance with the type of optical fiber (e.g., pinhole, light pipe, 2-component fiber, or 3-component fiber). The gap 206 between the cover material 204 and a top portion of a 3-component fiber is optionally between 20 to 50 micrometers.

In addition to the proximity sensor, the electronic device can include sensing device(s) that can include sensor circuitry configured to sense one or more types of parameters, such as but not limited to, vibration; light; touch; force; heat; movement; relative motion; biometric data (e.g., biological parameters) of a user; air quality; proximity; position; connectedness; and so on. In some examples, the sensing device(s) can include an image sensor such as an outward facing camera, a radiofrequency sensor (and/or transmitter), an infrared sensor (and/or transmitter), a magnetic sensor (and/or generator) (e.g., a magnetometer), an ultrasonic sensor (and/or transmitter), and/or an inertial measurement unit. In some examples, the sensing device(s) can further include other sensor(s) including a force sensor, a heat sensor, a position sensor, a light or optical sensor, an accelerometer, a pressure transducer, a gyroscope, an acoustic sensor, a health monitoring sensor, and/or an air quality sensor, among other possibilities. Additionally, the one or more sensors of the sensing device(s) can utilize any suitable sensing technology, including, but not limited to, interferometric, magnetic, capacitive, ultrasonic, resistive, optical, acoustic, piezoelectric, or thermal technologies.

In some examples, the electronic device, which includes the proximity sensing system 200 (e.g., including a proximity sensor and the target 202 (e.g., top portion of a touch screen)), can include a power source (e.g., energy storage device such as a battery), processor, program storage device and/or memory, and wireless communication circuitry. The processor can control some or all of the operations of the electronic device. The processor can communicate, either directly or indirectly, with some or all of the other components of the electronic device. For example, a system bus or other communication mechanism can provide communication between the power source, the processor, the display, the program storage device, the memory, the wireless communication circuitry, and the proximity sensor.

The processor can be implemented as any electronic device capable of processing, receiving, or transmitting data or instructions, whether such data or instructions is in the form of software or firmware or otherwise encoded. For example, the processor can include a microprocessor, a central processing unit (CPU), an application-specific integrated circuit (ASIC), a digital signal processor (DSP), a controller, or a combination of such devices. As described herein, the term "processor" or "processing circuitry" is meant to encompass a single processor or processing unit, multiple processors, multiple processing units, or other suitably configured computing element or elements.

The processor can receive touch input to the display) or other input devices and perform actions based on the outputs. For example, the processor can be connected to the program storage (and/or memory) and a display controller/driver to generate images on the display screen. The display screen includes, but is not limited to, Liquid Crystal Display (LCD) displays, Light-Emitting Diode (LED) displays, including Organic LED (OLED), Active-Matrix Organic LED (AMOLED), Passive-Matrix Organic LED (PMOLED) displays, a projector, a holographic projector, a retinal projector, or other suitable display. In some examples, the display driver can provide voltages on select (e.g., gate) lines to each pixel transistor and can provide data signals along data lines to these same transistors to control the pixel display image for the display.

In some examples, transmitter optical fiber 210 and receiver optical fiber 212 of the proximity sensing system 200 are integrated with the display. In some examples, the optical transmitter circuitry corresponding to the transmitter optical fiber 210 is included in or otherwise coupled to a transmitter die 214, and the optical receiver circuitry corresponding to the receiver optical fiber 212 is included in or otherwise coupled to a receiver die 216. In some examples, the transmitter optical fiber 210 is separated from the transmitter die 214 by a threshold distance (e.g., as shown by gap 222 in FIG. 2A). In some examples, the receiver optical fiber 212 is separated from the transmitter die 214 by a threshold distance (e.g., as shown by gap 222 in FIG. 2A). In some examples, gap 222 is the same size as the gap 206 between the cover material and the top portions of the transmitter optical fiber 210 and the receiver optical fiber 212. In some examples, gap 222 is different in size compared to the gap 206. In some examples, gap 222 is 1, 10, 20, 50, 100, 150, or 200 micrometers. As used herein, the transmitter die 214 is a block of semiconductive material (e.g., silicon) upon which optical transmitter circuitry structures and functions are fabricated. In some examples, the optical transmitter circuitry is contained within the transmitter die 214. In some examples, the transmitter die 214 includes light emitters. As used herein, the receiver die 216 is a block of semiconductive material (e.g., silicon) upon which optical receiver circuitry structures and functions are fabricated. In some examples, the optical receiver circuitry is contained within the receiver die 216. In some examples, the receiver die includes light detectors such as photodetectors.

Figure 2B:
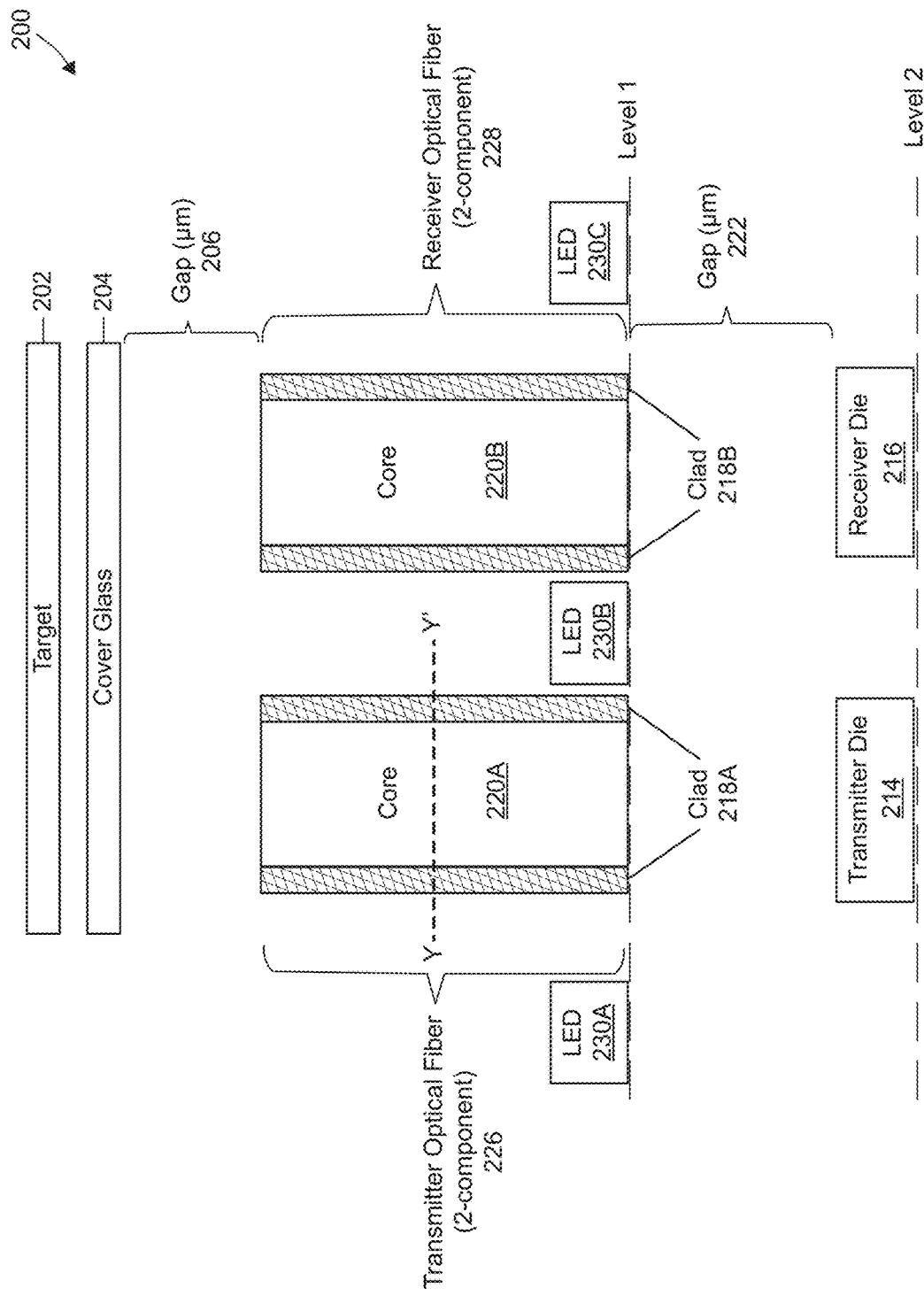
FIG. 2B illustrates a block diagram of an example proximity sensing system including a 2-component optical fiber according to examples of the disclosure.

In some examples, the transmitter die 214 and the receiver die 216 are disposed between Light-Emitting Diodes (LEDs) of the display such that the transmitter die 214 can emit light through the spaces between the Light-Emitting Diodes (LEDs) and the receiver die 216 can receive light from the target 202 through the spaces between the LEDs. In some examples, the transmitter die 214 and the receiver die 216 are aligned with openings between LEDs of the display in a manner such that the LEDs do not interfere with the transmission of light from the transmitter die 214 to the transmitter optical fiber 210 and/or the transmission of light from the receiver die 216 to the receiver optical fiber 212. However, in some examples, the LEDs and the transmitter die 214 and/or the receiver die 216 are aligned with the openings between LEDs and disposed in the same level (e.g., mounted to the same surface as shown in FIG. 2A). In some examples, the LEDs and the transmitter die 214 and/or the receiver die 216 aligned with the openings between LEDs are disposed at different levels (e.g., mounted to different surfaces as shown in FIG. 2B). For example, as shown in FIG. 2B, the transmitter die 214 and the receiver die 216 are disposed at a lower level compared to the LEDs (e.g., below the display LEDs) such that the transmitter optical fiber 210 and the receiver optical fiber 212 pass between the LEDs. In FIG. 2B, the LEDs 230A, 230B, and 230C are disposed at a first level (e.g., Level 1) while the transmitter die 214 and the receiver die 216 are disposed at a second level (e.g., Level 2) which is below the first level. In some examples, the transmitter die 214 and the receiver die 216 are aligned with the openings between LEDs around a perimeter of the display.

As shown in FIG. 2A, the transmitter die 214 and the receiver die 216 are aligned with the openings between LEDs and disposed between the LEDs of the display such that the LEDs and the transmitter die 214 and/or the receiver die 216 are disposed in the same level (e.g., Level 1). For example, at Level 1 in FIG. 2A, LED 230A is disposed to the left of the transmitter die 214, LED 230B is disposed between the transmitter die 214 and the receiver die 216, and LED 230C is disposed to the right of the receiver die 216. It should be noted that the configuration of the transmitter die 214 and the receiver die 216 in FIG. 2A can be used in conjunction with 2-component optical fibers.

The processor can cause a display image on the display, such as a display image of a user interface (UI) and can use touch processor and/or touch controller to detect a touch on or near the display, such as a touch input to the displayed UI when the electronic device includes the touch screen. The touch input can be used by computer programs stored in program storage to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The processor can also perform additional functions that may not be related to touch processing or proximity sensing.

Note that one or more of the functions described in this disclosure can be performed by firmware stored in memory and/or stored in program storage and executed by the processor or other processing circuitry of the electronic device. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, the program storage and/or memory can be a non-transitory computer readable storage medium. The non-transitory computer readable storage medium (or multiple thereof) can have stored therein instructions, which when executed by the processor or other processing circuitry, can cause the device including the electronic device to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, universal serial bus (USB) memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

The power source can be implemented with any device capable of providing energy to the electronic device. For example, the power source can include one or more batteries or rechargeable batteries. Additionally or alternatively, the power source can include a power connector or power cord that connects the electronic device to another power source, such as a wall outlet. The memory can store electronic data that can be used by electronic device including proximity sensing system 200. For example, memory can store electrical data or content such as, for example, audio and video files, documents and applications, device settings and user preferences, timing signals, control signals, and data structures or databases. The memory can include any type of memory. By way of example only, the memory can include random access memory, read-only memory, Flash memory, removable memory, other types of storage elements, or combinations of such memory types.

In some examples, wireless communication circuitry can transmit or receive data from another electronic device. In some examples, the wireless and/or wired communications interfaces can include, but are not limited to, cellular, Bluetooth, and/or Wi-Fi communications interfaces. Although not shown, the electronic device can also include other input/output mechanisms including one or more touch sensing input surfaces, a crown, one or more physical buttons, one or more microphones or speakers, one or more ports such as a microphone port, and/or a keyboard.

Figure 4D:
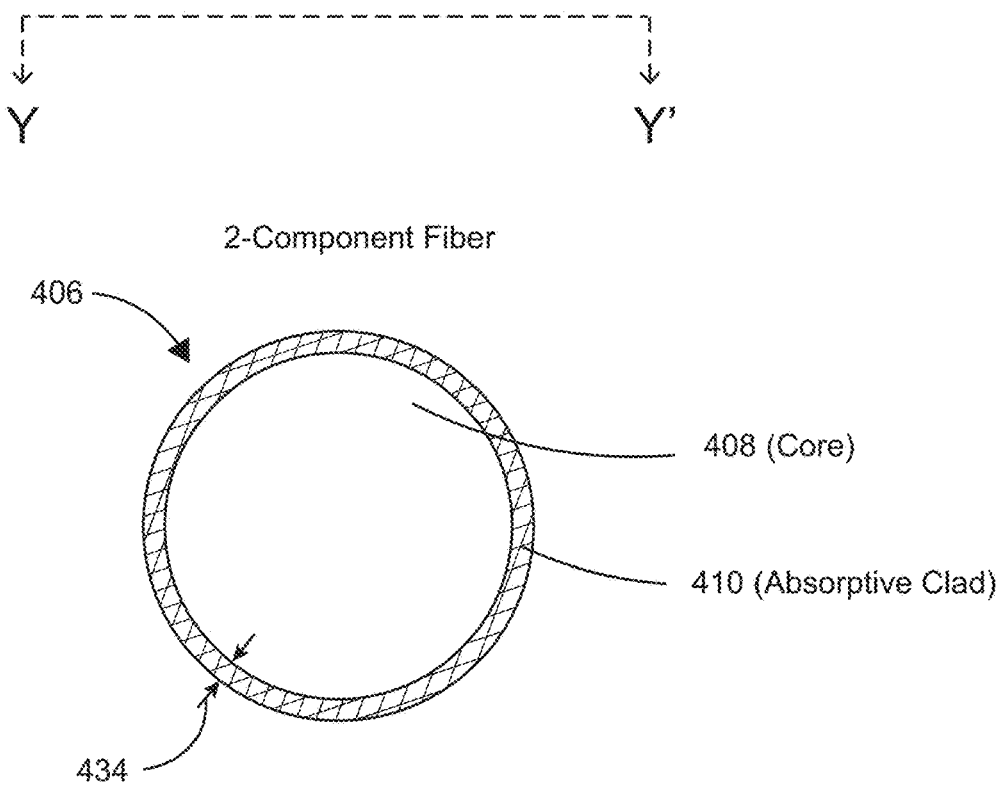

FIG. 2B illustrates a block diagram of an example proximity sensing system 200 including a 2-component optical fiber according to examples of the disclosure. The proximity sensing system 200 of FIG. 2B includes one or more characteristics of the proximity sensing system 200 of FIG. 2A the details of which are not repeated for brevity. As illustrated in FIG. 2B, the proximity sensing system 200 includes a transmitter optical fiber 226 and a receiver optical fiber 228. In FIG. 2B, the transmitter optical fiber 226 and the receiver optical fiber 228 are 2-component fibers rather than 3-component fibers. That is, each of the transmitter optical fiber 226 and the receiver optical fiber 228 includes a core and an absorptive clad. For example, the transmitter optical fiber 226 includes the core 220A. With respect to the transmitter optical fiber 226, the core 220A is circumferentially surrounded by absorptive clad 218A. Similarly, the receiver optical fiber 228 includes core 220B. With respect to receiver optical fiber 228, the core 220B is circumferentially surrounded by absorptive clad 218B. As indicated by the dashed line between Y and Y', structures of the 2-component optical fiber are further described with respect to the cross-section of the 2-component fiber as shown in FIG. 4D. In some examples, the proximity sensing system 200 includes the respective absorptive clad of the transmitter optical fiber 210 and the receiver optical fiber 212 to absorb the unwanted and/or excessive light between the optical transmitter circuitry and the optical receiver circuitry. It should be noted that the target 202, cover material 204, gap 206, core 220A, core 220B, absorptive clad 218A, absorptive clad 218B, transmitter die 214, and the receiver die 216 of FIG. 2B include similar features and characteristics from FIG. 2A and corresponding description from FIG. 2A is not repeated.

As mentioned above, the transmitter die and the receiver die are optionally disposed on a different level compared to the LEDs. Accordingly, as shown in FIG. 2B, the transmitter die 214 and the receiver die 216 are disposed below the LEDs of the display (e.g., LEDs 230A, 230B, and 230C are disposed on Level 1 while the transmitter die 214 and the receiver die 216 are disposed on Level 2). For example, at Level 1 in FIG. 2B, LED 230A is disposed to the left of the transmitter optical fiber 226, LED 230B is disposed between the transmitter optical fiber 226 and the receiver optical fiber 228, and LED 230C is disposed to the right of the receiver optical fiber 228. In this configuration, the transmitter optical fiber 226 and the receiver optical fiber 228 pass through the display of the electronic device. It should be noted that the configuration of the transmitter die 214 and the receiver die 216 in FIG. 2B can be used in conjunction with 3-component optical fibers.

It should be apparent that the architectures shown in FIGS. 2A-2B are only example architectures of the proximity sensing system 200 and that the system could have more or fewer components than shown, or a different configuration of components. The various components shown in FIGS. 2A-2B and/or the operation thereof can be implemented in hardware, software, firmware, or any combination thereof, including one or more signal processing and/or application specific integrated circuits. For example, the software and/or the firmware optionally controls and/or processes the optical signals transmitted by the transmitter die 214 and/or the reflected optical signals from the target 202 detected by the receiver die 216 in FIGS. 2A-2B. For example, the software and/or the firmware optionally controls sensing and processing capabilities of one or more proximity sensors.

Figure 3A:
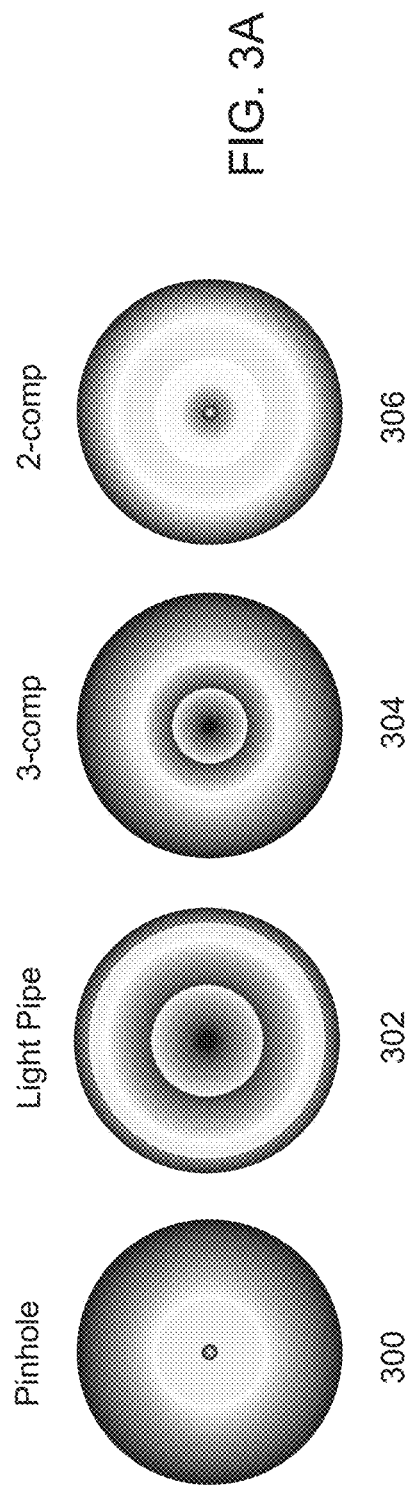
FIG. 3A illustrates respective angular heat maps associated with respective optical fibers according to examples of the disclosure.

FIG. 3A illustrates respective angular heat maps associated with various optical fibers (e.g., pinhole, light pipe, 3-component fiber, 2-component fiber). The pinhole 300 includes a core and an absorptive clad as shown in FIG. 4A and described in detail below. The core of the pinhole is smaller compared to respective cores of the 3-component fiber and/or the 2-component fiber. As shown in FIG. 3A, with respect to the heat map of pinhole 300, higher levels of energy and light diffusion is present near a center of the pinhole 300 corresponding to the core (shown by lighter shading) compared to a boundary of the pinhole 300 corresponding to the absorptive clad (shown by darker shading). Unlike the pinhole 300, light pipe 302 is entirely a core without an absorptive clad as shown in FIG. 4B and described in detail below. As shown in FIG. 3A, with respect to the heat map of pinhole 300, higher levels of energy and light diffusion is present near a center of the light pipe 302 (shown by lighter shading) corresponding to an inner portion of the core compared to a boundary of the light pipe 302 corresponding to an outer portion of the core (shown by darker shading). In FIG. 3A, lighter shading in the respective heat maps correspond to higher levels of energy and increased light diffusion while darker shading in the respective heat maps correspond to lower levels of energy and reduced light diffusion. Further, because the light pipe 302 does not include an absorptive clad, energy levels at the boundary of the light pipe 302 are high compared to the energy levels at the boundary of the pinhole 300.

The 3-component fiber 304 includes a core, an absorptive clad surrounding the core, and an absorptive jacket surrounding the absorptive clad as shown in FIG. 4C and described in detail below. As shown in FIG. 3A, with respect to the heat map of 3-component fiber 304, higher levels of energy and light diffusion is present near a center of the 3-component fiber 304 corresponding to the core (shown by lighter shading) compared to a boundary of the 3-component fiber 304 corresponding to the absorptive clad and the absorptive jacket (shown by darker shading). The 2-component fiber 306 includes a core and an absorptive clad surrounding the core as shown in FIG. 4D and described in detail below. As shown in FIG. 3A, with respect to the heat map of the 2-component fiber 306, higher levels of energy and light diffusion is present near a center of the 2-component fiber 306 corresponding to the core (shown by lighter shading) compared to a boundary of the 2-component fiber 306 corresponding to the absorptive clad (shown by darker shading). Indeed, the heat map of the 3-component fiber 304 depicts more regions with lower levels of energy compared to heat map of the 2-component fiber 306 because the additional absorptive jacket of the 3-component fiber 304 absorbs excess light. Accordingly, the 3-component fiber 304 can be better suited to reducing cross-talk associated with a proximity sensing module compared with the 2-component fiber 306.

Figure 3B:
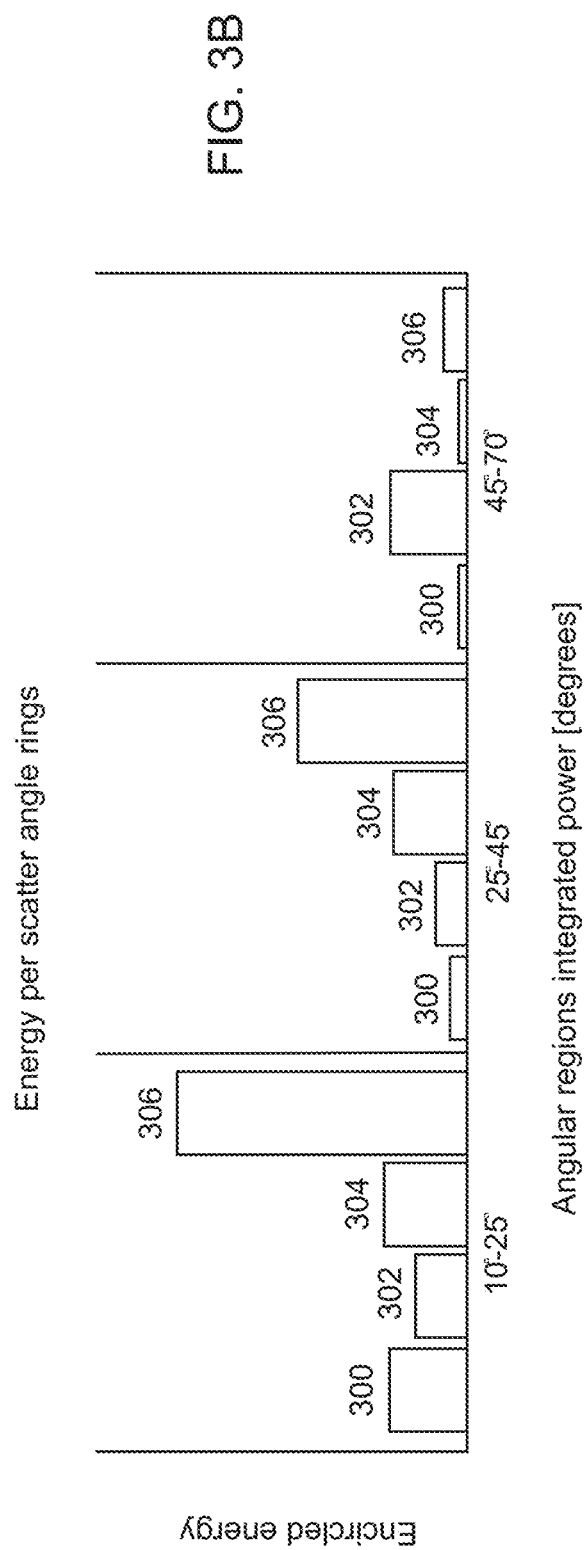
FIG. 3B illustrates respective energy graphs associated with respective optical fibers according to examples of the disclosure.

FIG. 3B illustrates respective energy graphs associated with various optical fibers (e.g., pinhole, light pipe, 3-component fiber, 2-component fiber). The energy graphs depict the level of encircled energy corresponding to respective optical fibers at different angular region. At a low angular region (e.g., 10°-25°, the 2-component fiber 306 corresponds to the highest level of energy, and thus cross-talk. Further at the low angular region (e.g., 10°-25°, the pinhole 300 and the 3-component fiber 304 correspond to the about the same level of energy, and the light pipe 302 corresponds to the lowest level of energy. At a medium angular region (e.g., 25°-45°, the 2-component fiber 306 corresponds to the highest level of energy, and thus cross-talk, among the various optical fibers. Further at the medium angular region (e.g., 25°-45°, the pinhole 300 and the light pipe 302 correspond to lower levels of energy compared to the 3-component fiber 304. At a high angular region (e.g., 45°-70°, the light pipe 302 corresponds to the highest level of energy, and thus cross-talk, among the various optical fibers. Further at the high angular region (e.g., 45°-70°, the pinhole 300 and the 3-component fiber 304 correspond to the lowest levels of energy. In fact, at the high angular region (e.g., 45°-70°, the 3-component fiber 304 corresponds to a significant decrease in energy compared to the medium angular region (e.g., 25°-45°. Because the 3-component fiber 304 corresponds to low levels of energy and light scattering even at high angular regions, the 3-component fiber 304 can be better suited to reduce cross-talk associated with a proximity sensing module compared with the 2-component fiber 306.

In some examples, the optical fibers can include cylindrical optical fibers (e.g., as illustrated in FIGS. 4A-4D), elliptical optical fibers, or any suitable geometric shaped optical fibers. In some examples, an optical fiber is tapered at a first end compared to second end (e.g., opposite end). In some examples, an optical fiber is tapered at the second end compared to the first end. In some examples, an optical fiber is tapered at both the first and second ends compared to a center of the optical fiber. FIGS. 4A-4D illustrate cross-sections of various optical fibers. FIG. 4A illustrates a pinhole 400 that includes a core 408 and an absorptive clad 410 surrounding the core 408. As mentioned above, the pinhole 400 has a smaller core 408 compared to the respective cores of the 3-component fiber 404 and the 2-component fiber 406. That is, the diameter of the core 408 of the pinhole 400 is significantly less than respective cores 408 of the 3-component fiber 404, 2-component fiber 406, and light pipe 402. Instead, the diameter of the absorptive clad 410 of the pinhole 400 is greater than respective absorptive clads 410 of the 3-component fiber 404, 2-component fiber 406, and the light pipe 402.

FIG. 4B illustrates the light pipe 402 that includes a core 408. As mentioned above, the light pipe 402 is entirely comprised of core 408. That is, the diameter of the core 408 of the light pipe 402 is significantly greater than respective cores 408 of the 3-component fiber 404, 2-component fiber 406, and pinhole 400.

FIG. 4C illustrates a cross-section of a 3-component fiber, such as a transmitter optical fiber or a receiver optical fiber. In particular, FIG. 4C illustrates a cross-section of the transmitter optical fiber 210 in FIG. 2A as shown by the dashed line between X and X'. In FIG. 4C, 3-component fiber 404 includes a core 408, an absorptive clad 410 surrounding the core 408, and an absorptive jacket 412 surrounding the absorptive clad 410. The absorptive jacket 412 can mechanically protect the inner components of the optical fiber and/or simplify the handling of the optical fiber. Additionally or alternatively, the absorptive jacket 412 can reduce cross-talk by reflecting light that passes through the clad back into the core and/or by absorbing the light that passes through the clad. In some examples, the core 408 is composed of glass or plastic. In some examples, the absorptive clad 410 is composed of a different material compared to the absorptive jacket 412. For example, the different material of the absorptive jacket 412 is optionally more absorptive relative to the material of the absorptive clad 410. In some examples, the absorptive clad 410 includes one or more characteristics of the absorptive jacket 412. In some examples, the absorptive clad 410 is a hollow circular cross-sectional structure (e.g., ring shaped or disc shaped). In some examples, the absorptive jacket 412 is a hollow circular structure (e.g., ring shaped or disc shaped). In some examples, the absorptive clad 410 and the absorptive jacket 412 have the same axial thickness. In some examples, the absorptive clad 410 and the absorptive jacket 412 have different axial thicknesses. In some examples, the absorptive clad 410 has an axial thickness of 1, 5, 10, 15, or 20 micrometers (as shown by axial thickness 430 in FIG. 4C). In some examples, the absorptive jacket 412 has an axial thickness of 1, 5, 10, 15, or 20 micrometers (as shown by axial thickness 432 in FIG. 4C). In some examples, the diameter of the 3-component fiber 404 (e.g., including the core, absorptive clad, and the absorptive jacket) is less than 200, 250, 300, 350, 400, 450, or 500 micrometers.

FIG. 4D illustrates a cross-section of a 2-component fiber, such as a transmitter optical fiber or a receiver optical fiber. In particular, FIG. 4D illustrates a cross-section of the transmitter optical fiber 210 in FIG. 2C as shown by the dashed line between Y and Y'. FIG. 4D illustrates a 2-component fiber 406 that includes a core 408 and an absorptive clad 410 surrounding the core 408. In some examples, similar to the 3-component fiber 404, the absorptive clad 410 of the 2-component fiber 406 is also disc shaped. In some examples, the core 408 of the 2-component fiber 406 has the same diameter as the core 408 of the 3-component fiber 404. In some examples, the core 408 of the 2-component fiber 406 has a different diameter compared to the core 408 of the 3-component fiber 404. As mentioned above, the absorptive clad 410 of the 2-component fiber 406 optionally has an axial thickness of 1, 5, 10, 15, or 20 micrometers (as shown by axial thickness 434 in FIG. 4D). In some examples, absorptive clad 410 of the 2-component fiber 406 has the same axial thickness as the absorptive clad 410 of the 3-component fiber 404. In some examples, the absorptive clad 410 of the 2-component fiber 406 has a different axial thickness compared to the absorptive clad 410 of the 3-component fiber 404. In some examples, the proximity sensing module includes a 3-component fiber because an absorptive jacket absorbs light scattered between the optical transmitter circuitry and optical receiver circuitry, even at high angle scattering (e.g., 45°-70°), efficiently compared to a 2-component fiber, a pinhole, and/or a light pipe. Further, manufacturing 3-component fiber is less resource intensive and more flexible compared to manufacturing the pinhole, and/or the light pipe.

FIGS. 5A-5B illustrate light scattering relative to a 2-component fiber and a 3-component fiber. FIG. 5A illustrates a side view of a 2-component fiber 500 while FIG. 5B illustrates a side view of a 3-component fiber 502. As illustrated, with respect to the 2-component fiber 500, the light scattered (e.g., as shown by the right arrow in FIG. 5A) between the optical transmitter circuitry (e.g., $T_X$) and a target 504 and the light reflected (e.g., as shown by the left arrow in FIG. 5A) from the target 504 to the optical receiver circuitry (e. g., $R_X$) corresponds to a high amount of diffusion (as shown by the jagged lines). With respect to the 3-component fiber 502, the light scattered (e.g., as shown by the right arrow in FIG. 5B) between the optical transmitter circuitry (e. g., $T_X$) and the target 504 and the light reflected (e.g., as shown by the left arrow in FIG. 5B) from the target 504 to the optical receiver circuitry (e. g., $R_X$) corresponds to a low amount of diffusion (as shown by smooth lines). The lower amount of light scattering of the 3-component fiber 502 corresponds to a reduce level of cross-talk compared to the 2-component fiber 500. As discussed above, adding an absorptive jacket around optical transceiver circuity can help reduce cross-talk associated with a proximity sensing module.

Therefore, according to the above, some examples of the disclosure are directed to an electronic device. The electronic device can comprise a cover material, a transmitter optical fiber, and a receiver optical fiber. The transmitter optical fiber can include a first core and a first absorptive jacket circumferentially surrounding the first core. The receiver optical fiber can include a second core and a second absorptive jacket circumferentially surrounding the second core. Additionally or alternatively to one or more of the examples disclosed above, in some examples, the electronic device comprises a touch screen including the cover material and optical transceiver circuitry comprising optical transmitter circuitry and optical receiver circuitry. The transmitter optical fiber is disposed between the cover material of the touch screen, and the optical transmitter circuitry and the receiver optical fiber is disposed between the cover material of the touch screen and the optical receiver circuitry. Additionally or alternatively to one or more of the examples disclosed above, in some examples, the transmitter optical fiber includes a first absorptive clad between the first absorptive jacket and the first core, and the receiver optical fiber includes a second absorptive clad between the second absorptive jacket and the second core. Additionally or alternatively to one or more of the examples disclosed above, in some examples, the first absorptive clad and/or the second absorptive clad are disc-shaped, and the first absorptive clad has an axial thickness between 10 to 20 micrometers and/or the second absorptive clad has an axial thickness between 10 to 20 micrometers. Additionally or alternatively to one or more of the examples disclosed above, in some examples, the first absorptive jacket and/or the second absorptive jacket are disc-shaped, and the first absorptive jacket has an axial thickness between 10 to 20 micrometers and/or the second absorptive jacket has an axial thickness between 10 to 20 micrometers. Additionally or alternatively to one or more of the examples disclosed above, in some examples, the transmitter optical fiber is less than 500 micrometers in diameter and/or the receiver optical fiber is less than 500 micrometers in diameter. Additionally or alternatively to one or more of the examples disclosed above, in some examples, the cover material is less than 150 micrometers in height. Additionally or alternatively to one or more of the examples disclosed above, in some examples, the cover material is separated from a top portion of the transmitter optical fiber and/or the cover material is separated from a top portion of the receiver optical fiber by a threshold distance. Additionally or alternatively to one or more of the examples disclosed above, in some examples, the threshold distance between the cover material and the top portion of the transmitter optical fiber is less than 50 micrometers and/or the threshold distance between the cover material and the top portion of the receiver optical fiber is less than 50 micrometers. Additionally or alternatively to one or more of the examples disclosed above, in some examples, the threshold distance between the cover material and the top portion of the transmitter optical fiber is less than 200 micrometers and/or the threshold distance between the cover material and the top portion of the receiver optical fiber is less than 200 micrometers. Additionally or alternatively to one or more of the examples disclosed above, in some examples, the transmitter optical fiber and/or the receiver optical fiber include a cylindrical optical fiber.

Some examples of the disclosure are directed to a touch screen device. The touch screen device can comprise optical transceiver circuitry, a cover material, and one or more cylindrical optical fibers, where a first cylindrical optical fiber includes a first core, a first absorptive clad circumferentially surrounding the first core, and a first absorptive jacket circumferentially surrounding the first absorptive clad. Additionally or alternatively to one or more of the examples disclosed above, in some examples, the first absorptive jacket is disc-shaped with an axial thickness less than 30 micrometers. Additionally or alternatively to one or more of the examples disclosed above, in some examples, the first absorptive clad is disc-shaped with an axial thickness less than 30 micrometers. Additionally or alternatively to one or more of the examples disclosed above, in some examples, the first cylindrical optical fiber is between 350 and 450 micrometers in diameter. Additionally or alternatively to one or more of the examples disclosed above, in some examples, the cover material is between 100 and 150 micrometers in height. Additionally or alternatively to one or more of the examples disclosed above, in some examples, the cover material is separated from a top portion of the first cylindrical optical fiber by a threshold distance.

Some examples of the disclosure are directed to a proximity sensing module. The proximity sensing module can comprise a first optical fiber including a first core, wherein the first core is circumferentially surrounded by a first absorptive jacket. The proximity sensing module can comprise a second optical fiber including a second core, wherein the second core is circumferentially surrounded by a second absorptive jacket. The first optical fiber is disposed between a cover material and optical transmitter circuitry or optical receiver circuitry, and the second optical fiber is disposed between the cover material and the optical transmitter circuitry or the optical receiver circuitry. Additionally or alternatively to one or more of the examples disclosed above, in some examples, the first optical fiber includes a first absorptive clad between the first absorptive jacket and the first core, and the second optical fiber includes a second absorptive clad between the second absorptive jacket and the second core. Additionally or alternatively to one or more of the examples disclosed above, in some examples, the cover material is between 20 and 200 micrometers in height.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:
1. An electronic device, comprising:
 a cover material;
 a transmitter optical fiber including a first core and a first absorptive jacket circumferentially surrounding the first core; and a receiver optical fiber including a second core and a second absorptive jacket circumferentially surrounding the second core, wherein the cover material is separated from a top portion of the transmitter optical fiber, or the cover material is separated from a top portion of the receiver optical fiber, by a threshold distance of less than 200 micrometers.

2. The electronic device of claim 1, further comprising:
a touch screen including the cover material; and
optical transceiver circuitry comprising optical transmitter circuitry and optical receiver circuitry;
wherein the transmitter optical fiber is disposed between the cover material of the touch screen and the optical transmitter circuitry, and the receiver optical fiber is disposed between the cover material of the touch screen and the optical receiver circuitry.

3. The electronic device of claim 1, wherein the transmitter optical fiber includes a first absorptive clad between the first absorptive jacket and the first core, and the receiver optical fiber includes a second absorptive clad between the second absorptive jacket and the second core.

4. The electronic device of claim 3, wherein the first absorptive clad and/or the second absorptive clad are disc-shaped, and wherein the first absorptive clad has an axial thickness between 10 to 20 micrometers and/or the second absorptive clad has an axial thickness between 10 to 20 micrometers.

5. The electronic device of claim 1, wherein the first absorptive jacket and/or the second absorptive jacket are disc-shaped, and wherein the first absorptive jacket has an axial thickness between 10 to 20 micrometers and/or the second absorptive jacket has an axial thickness between 10 to 20 micrometers.

6. The electronic device of claim 1, wherein the transmitter optical fiber is less than 500 micrometers in diameter and/or the receiver optical fiber is less than 500 micrometers in diameter.

7. The electronic device of claim 1, wherein the cover material is less than 150 micrometers in height.

8. The electronic device of claim 1, wherein the threshold distance between the cover material and the top portion of the transmitter optical fiber is less than 50 micrometers and/or the threshold distance between the cover material and the top portion of the receiver optical fiber is less than 50 micrometers.

9. The electronic device of claim 1, wherein the transmitter optical fiber and/or the receiver optical fiber include a cylindrical optical fiber.

10. The electronic device of claim 1, wherein the first absorptive jacket and the second absorptive jacket are configured to absorb light scattered at an angle between 45 degrees and 70 degrees.

11. A touch screen device, comprising:
optical transceiver circuitry;
a cover material; and
one or more cylindrical optical fibers, wherein a first cylindrical optical fiber includes a first core, a first absorptive clad circumferentially surrounding the first core, and a first absorptive jacket circumferentially surrounding the first absorptive clad, and wherein the cover material is separated from a top portion of the first cylindrical optical fiber by a threshold distance of less than 200 micrometers.

12. The touch screen device of claim 11, wherein the first absorptive jacket is disc-shaped with an axial thickness less than 30 micrometers.

13. The touch screen device of claim 11, wherein the first absorptive clad is disc-shaped with an axial thickness less than 30 micrometers.

14. The touch screen device of claim 11, wherein the first cylindrical optical fiber is between 350 and 450 micrometers in diameter.

15. The touch screen device of claim 11, wherein the cover material is between 100 and 150 micrometers in height.

16. The touch screen device of claim 11, wherein the first absorptive jacket is configured to absorb light scattered at an angle between 45 degrees and 70 degrees.

17. A proximity sensing module, comprising:
a first optical fiber including a first core, wherein the first core is circumferentially surrounded by a first absorptive jacket; and
a second optical fiber including a second core, wherein the second core is circumferentially surrounded by a second absorptive jacket;
wherein the first optical fiber is disposed between a cover material and optical transmitter circuitry or optical receiver circuitry and the second optical fiber is disposed between the cover material and the optical transmitter circuitry or the optical receiver circuitry, and wherein the cover material is separated from a top portion of the first optical fiber, or the cover material is separated from a top portion of the second optical fiber, by a threshold distance of less than 200 micrometers.

18. The proximity sensing module of claim 17, wherein the first optical fiber includes a first absorptive clad between the first absorptive jacket and the first core, and the second optical fiber includes a second absorptive clad between the second absorptive jacket and the second core.

19. The proximity sensing module of claim 17, wherein the cover material is between 20 and 200 micrometers in height.

20. The proximity sensing module of claim 17, wherein the first absorptive jacket and the second absorptive jacket are configured to absorb light scattered at an angle between 45 degrees and 70 degrees.

* * * * *